(12) United States Patent
Wu et al.

(10) Patent No.: US 12,224,793 B2
(45) Date of Patent: Feb. 11, 2025

(54) OPTICAL TIME DOMAIN REFLECTOR STRUCTURE AND THE OPTICAL ASSEMBLY THEREOF

(71) Applicant: EZCONN CORPORATION, New Taipei (TW)

(72) Inventors: Chin-Tsung Wu, New Taipei (TW); Shu-Fen Liao, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 565 days.

(21) Appl. No.: 17/314,093

(22) Filed: May 7, 2021

(65) Prior Publication Data

US 2022/0360326 A1    Nov. 10, 2022

(51) Int. Cl.
| | | |
|---|---|---|
| *H04B 10/071* | (2013.01) | |
| *G02B 6/42* | (2006.01) | |
| *H04B 10/40* | (2013.01) | |

(52) U.S. Cl.
CPC ......... *H04B 10/071* (2013.01); *G02B 6/4246* (2013.01); *H04B 10/40* (2013.01)

(58) Field of Classification Search
CPC ..... H04B 10/071; H04B 10/40; G02B 6/4246
See application file for complete search history.

(56) References Cited

U.S. PATENT DOCUMENTS

| | | | | |
|---|---|---|---|---|
| 8,965,193 | B1 * | 2/2015 | Svec | ................... G02B 17/0808 |
| | | | | 359/731 |
| 2013/0107265 | A1 * | 5/2013 | Wu | ....................... H04B 10/071 |
| | | | | 356/445 |

* cited by examiner

*Primary Examiner* — Jamil Ahmed
(74) *Attorney, Agent, or Firm* — Rankin, Hill & Clark LLP

(57) ABSTRACT

An optical time domain reflector structure and the optical assembly is disclosed in the present invention. The optical assembly comprise an optical time domain reflector structure, a light guiding module and an optical transceiver sub-module. By disposing the optical time domain reflector structure in the optical transceiver sub-module can reduce the overall space. The optical signals emitted from the light guiding module can be reflected back to the optical fiber by the disposing of the reflection filter of the optical time domain reflector structure. Due to the two different radius of curvature of the first reflection surface and the second reflection surface of the reflection filter, the required optical signal can be completely refocused to return to the optical fiber, so that the intensity loss of the optical signals can also be reduced.

22 Claims, 5 Drawing Sheets

OPTICAL TIME DOMAIN REFLECTOR STRUCTURE AND THE OPTICAL ASSEMBLY THEREOF

TECHNICAL FIELD

Example embodiments relate generally to the field of an optical time domain reflector structure and the optical assembly thereof. More particularly, the invention relates especially to an optical time domain reflector structure and the optical assembly thereof which can reflect the optical signals back along to the original path when the optical signals are transmitted to the optical transceiver sub-module.

BACKGROUND

To face the advent of a highly information-based society, communication infrastructure is needed to transmit various kinds of information, such as voice, text, data, images, etc. Accordingly, the optical communication network was developed to replace the conventional copper cable networks for huge information transmission. As known, in the field of optical communication, the optical fiber is especially suitable for serving as the medium for light transmission over long distances due to its advantages of low loss and wide bandwidth Optical fiber has advantages of low loss and broadband, and is suitable for information transmission between locations at a long distance. However, during the transmission process, it is inevitable that line disconnection or poor transmission will occur. Therefore, how to effectively monitor the connections of the lines has become an important issue in the field of optical fiber transmission.

Optical time domain reflectometer (OTDR) is an optical instrument used for analysis, fault detection and maintenance of optical communication networks. It can verify splice loss, measure length and find faults. The instrument emits out a light pulse and measures the light signals coming back over time. In other words, OTDR can be used as an optical fiber line monitoring device. Since it is possible to calibrate the speed of the light pulse as it passes down the fiber from the index of refraction of the glass in the core of the fiber, the OTDR can correlate what it sees in backscattered light with an actual location in the fiber. Thus, when no optical signal feedback is received, it can be judged that the optical fiber network line is normal, and when the feedback signal is received, the optical signal reflected or scattered back to the starting point can be used to obtain the exact location.

The detection and application of optical time domain reflectance require the cooperation of an optical time domain reflectance detector and an optical time domain reflector. In a prior art, the optical time domain reflector is a passive component, and the passive component is usually installed outside the optical transceiver sub-module. For example, the optical transceiver sub-module includes a Bi-Directional Optical Sub Assembly (BOSA), Tri-Directional Optical Sub Assembly (TRI-DI OSA), and so on. The inside of this passive element is equipped with Fiber Bragg Gratings (FBG), which acts as a reflector at a specific wavelength to reflect the specific wavelength back to the original path, and then to the optical time domain reflectance detector, and the rest of the wavelength can pass through the grating and continue to be transmitted in the optical fiber.

With the increase of the global population and the development of technology, equipment and tools in the field of optical transmission are aimed to lower the overall size. However, in the above-mentioned prior art, installing passive components outside the optical transceiver sub-module will inevitably occupy extra space, which is not conducive to the arrangement of other external components. In addition, the high cost and installation cost of passive components are also the main disadvantages of the prior art.

In view of the above-mentioned problems, the present invention provides an optical time domain reflector structure and the optical assembly thereof, so as to overcomes the above-mentioned shortcomings and proposes a practical optical time domain reflector device and the optical assembly thereof.

SUMMARY

One of the object of the present invention is to provide an optical time domain reflector structure. With the design of different radius of curvature of the two surfaces of the reflecting filter, when the optical signal is transmitted to the reflecting filter, the required wavelength of light will completely be reflected back to the original path by the surface of reflecting filter with the smaller radius of curvature.

One of the object of the present invention is to provide an optical time domain reflector structure and the optical assembly thereof. Instead of installing additional passive components outside the optical transceiver sub-module, the present invention directly disposing the optical time domain structure in the optical transceiver sub-module. Therefore, there is no need to consume extra space when installing the optical assembly of the present invention, the overall occupied space is greatly reduced.

To meet the abovementioned objects, the present invention provides an optical time domain reflector structure. The optical time domain reflector structure is configured to reflect at least a part of a plurality of optical signal on an optical path, the optical time domain reflector structure comprises a carrier and a reflection filter. The carrier has a first end and a second end, and comprises a restricting part and a fixing part, the restricting part is disposed between the first end and the second end, and the fixing part is disposed on the first end. The reflection filter is disposed on the fixing part, and connected to the first end, the reflection filter comprises a first reflection surface and a second reflection surface, the first reflection surface and the second reflection surface are respectively located on opposite sides of the reflection filter, the first and the second reflection surface have a first radius of curvature and a second radius of curvature respectively, and the first radius of curvature is not bigger than the second radius of curvature. Wherein parts of the optical signals are reflected by the reflection filter and back along to the optical path.

In some embodiments, wherein the reflection filter is disposed on the way of the optical path.

In some embodiments, wherein the straight distance between the reflection filter and the restricting part is not less than 3 mm.

In some embodiments, wherein the first reflection surface is disposed toward the first end.

In some embodiments, wherein the first radius of curvature of the first reflection surface is not less than 1 mm.

In some embodiments, wherein the first radius of curvature of the first reflection surface is unlimited.

In some embodiments, wherein the second radius of curvature of the second reflection surface is unlimited.

In some embodiments, wherein the reflection filter has a thickness, the thickness is the straight distance between the first reflection surface and the second reflection surface, and the thickness is not more than 0.7 mm.

In some embodiments, wherein the first reflection surface reflects the optical signals in a first wavelength range, and allows the optical signals in a second wavelength range.

In some embodiments, wherein the first wavelength range is between 1640 nm to 1660 nm, and the second wavelength range is between 1260 nm and 1590 nm.

To meet the abovementioned objects, the present invention provides an optical assembly. The optical assembly comprise an optical time domain reflector structure, a light guiding module and an optical transceiver sub-module. The optical time domain reflector structure is configured to reflect at least a part of a plurality of optical signal on an optical path, the optical time domain reflector structure comprises a carrier and a reflection filter. The carrier has a first end and a second end, and comprises a restricting part and a fixing part, the restricting part is disposed between the first end and the second end, and the fixing part is disposed on the first end. The reflection filter is disposed on the fixing part, and connected to the first end, the reflection filter comprises a first reflection surface and a second reflection surface, the first reflection surface and the second reflection surface are respectively located on opposite sides of the reflection filter, the first and the second reflection surface have a first radius of curvature and a second radius of curvature respectively, and the first radius of curvature is not bigger than the second radius of curvature. The reflection filter is disposed on the fixing part, and connected to the first end, the reflection filter comprises a first reflection surface and a second reflection surface, the first reflection surface and the second reflection surface are respectively located on opposite sides of the reflection filter, the first and the second reflection surface have a first radius of curvature and a second radius of curvature respectively, and the first radius of curvature is not bigger than the second radius of curvature. The light guiding module is connected to the optical time domain reflector structure, and disposed in the carrier through the second end. The optical transceiver sub-module is connected to the light guiding module, and the optical time domain reflector structure is disposed in the optical transceiver sub-module. Wherein, when a plurality of optical signals is emitted from the light guide module, parts of the optical signals enter the optical time domain reflector structure and reflected back to the light guiding module by the reflection filter.

In some embodiments, wherein the light guiding module comprises a ferrule fixing tube, a ferrule and an optical fiber, the ferrule is disposed inside the ferrule fixing tube, and the optical fiber is disposed inside the ferrule.

In some embodiments, wherein the ferrule fixing tube is disposed against the second end of the optical time domain reflector structure.

In some embodiments, wherein the ferrule is disposed against the restricting part of the optical time domain reflector structure.

In some embodiments, wherein the straight distance between the fiber and the reflection filter is not more than 3 mm.

In some embodiments, wherein the optical transceiver sub-module is selected from Bi-direction Optical Sub-Assembly (BOSA), Tri-Directional Optical Sub-Assembly (TRI-DI OSA), and the combination thereof.

In some embodiments, wherein the reflection filter is disposed on the way of an optical path, the optical signals follow the optical path when emitted from the light guiding module.

In some embodiments, wherein the first reflection surface reflects the optical signals in a first wavelength range, and allows the optical signals in a second wavelength range.

In some embodiments, wherein the first wavelength range is between 1640 nm to 1660 nm, and the second wavelength range is between 1260 nm and 1590 nm.

Therefore, an optical time domain reflector structure and the optical assembly is disclosed in the present invention. By disposing the optical time domain reflector structure in the optical transceiver sub-module to reduce the overall space. Besides, the optical signals emitted from the light guiding module can be reflected back to the optical fiber by the disposing of the reflection filter of the optical time domain reflector structure. Due to the two different radius of curvature of the first reflection surface and the second reflection surface of the reflection filter, the required optical signal can be completely refocused to return to the optical fiber, so that the intensity loss of the optical signals can also be reduced.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of restricting the present disclosure as defined by the appended claims and their equivalents.

Figure 1:
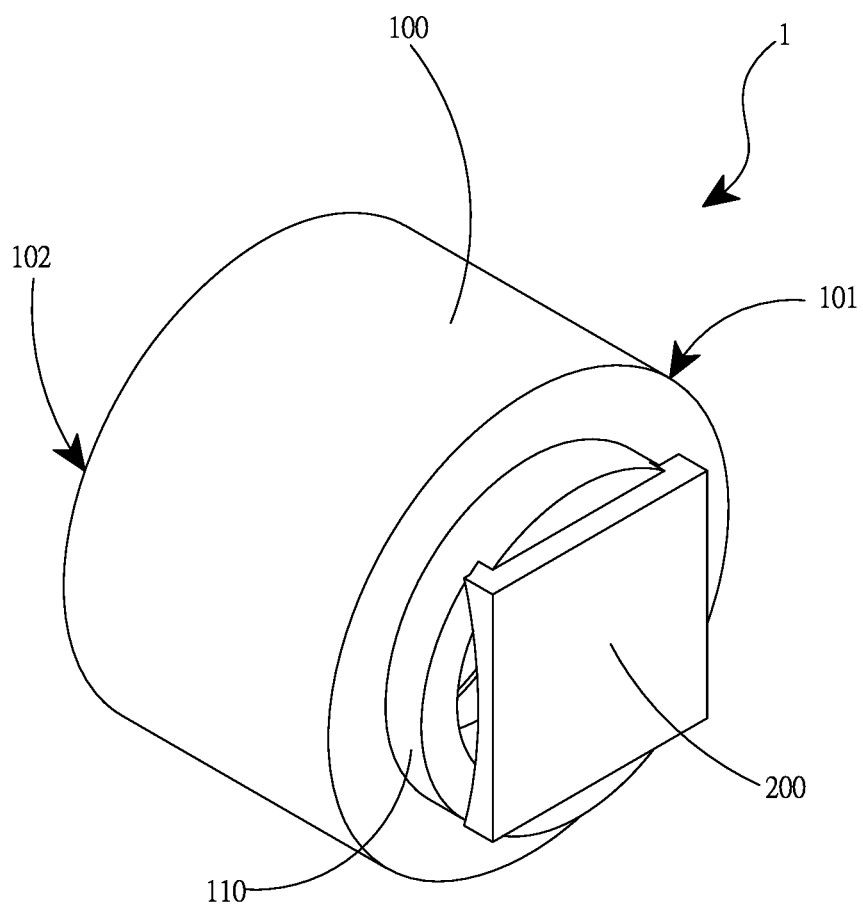
FIG. 1 illustrate a structure of an example embodiment of the optical time domain reflector.
Figure 2A:
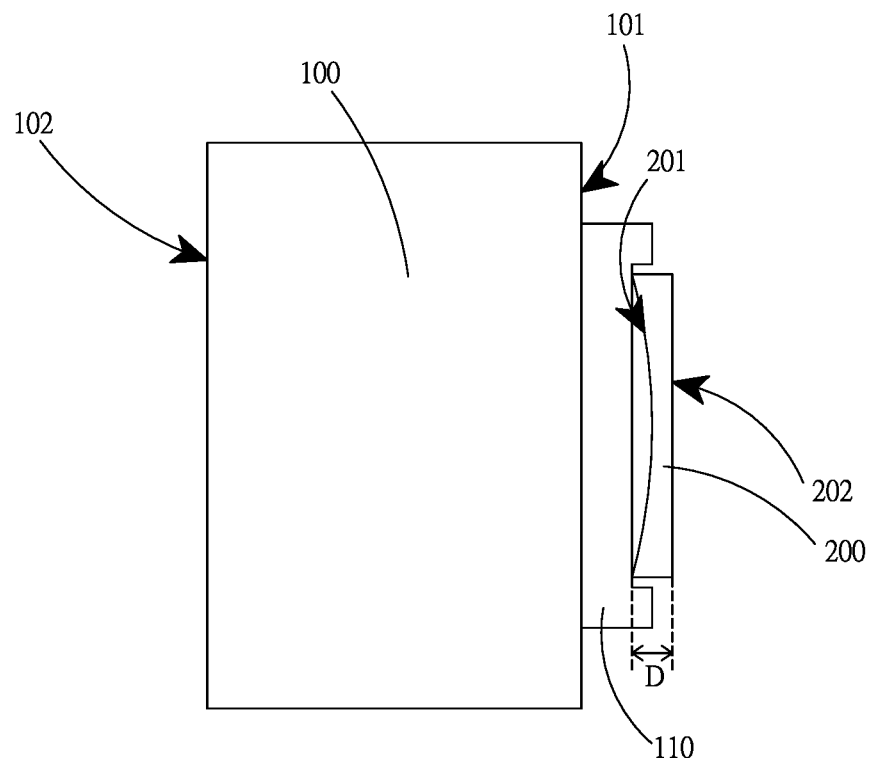
FIG. 2A illustrate a schematic side view of the structure of an example embodiment of the optical time domain reflector.
Figure 2B:
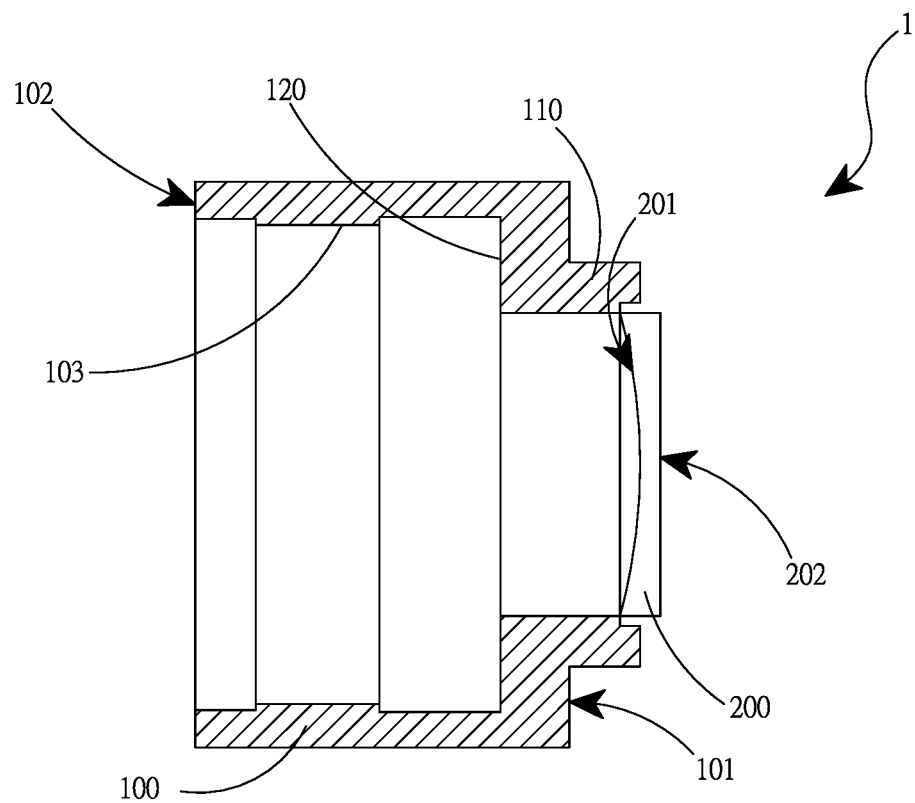
FIG. 2B illustrate a schematic of the cross-sectional structure in FIG. 2A of an example embodiment of the optical time domain reflector.

The optical time domain reflector structure of the present invention is configured to reflect at least a part of a plurality of optical signal on an optical path. More clearly, one end of the optical time domain reflector structure connects to the optical fiber, when the optical signals emitted from the optical fiber to the optical time domain reflector structure, parts of the optical signals will return back to the optical fiber. The structure of the present invention is described herein. Please refer to FIG. 1, FIG. 2A and FIG. 2B. FIG. 1 illustrate a structure of an example embodiment of the optical time domain reflector. FIG. 2A illustrate a schematic side view of the structure of an example embodiment of the optical time domain reflector. FIG. 2B illustrate a schematic of the cross-sectional structure in FIG. 2A of an example embodiment of the optical time domain reflector. The optical time domain reflector structure 1 comprises a carrier 100 and a reflection filter 200. The carrier 100 has a first end 101 and a second end 102, and comprises a restricting part 120 and a fixing part 110. The restricting part 120 is disposed between the first end 101 and the second end 102, and the fixing part 110 is disposed on the first end 101. The reflection filter 200 is disposed on the fixing part 110, and connected to the first end 101. The reflection filter 200 comprises a first reflection surface 201 and a second reflection surface 202, the first reflection surface 201 and the second reflection surface 202 are respectively located on opposite sides of the reflection filter 200. The first and the second reflection surface 201,202 have a first radius of curvature and a second radius of curvature respectively, and the first radius of curvature is not bigger than the second radius of curvature. Wherein the reflection filter 200 is located on an optical path, and parts of the optical signals on the optical path are reflected by the reflection filter 200 and back along to the optical path. In other words, the optical time domain reflection structure 1 allows an optical path to pass through, and the reflection filter 200 is located on the optical path. When the optical signals are transmitted to the reflection filter 200, the first reflection surface 201 and the second reflection surface 202 are partly transparent, so that parts of the optical signals are reflected by the first reflection surface 201 and returns to the light path, and the rest of the light signals are transmitted to the second reflection surface 202 through the first reflective surface 201.

In an embodiment of the present invention, the first reflection surface 201 of the reflection filter 200 is disposed toward the first end 101. The restricting part 120 is disposed on the inner surface 103 of the carrier 100. Generally, the second reflection surface 202 of the reflection filter 200, the first reflection surface 201 of the reflection filter 200, the fixing part 110 and the restricting part 120 are arranged along the axis of the carrier 100.

Figure 3:
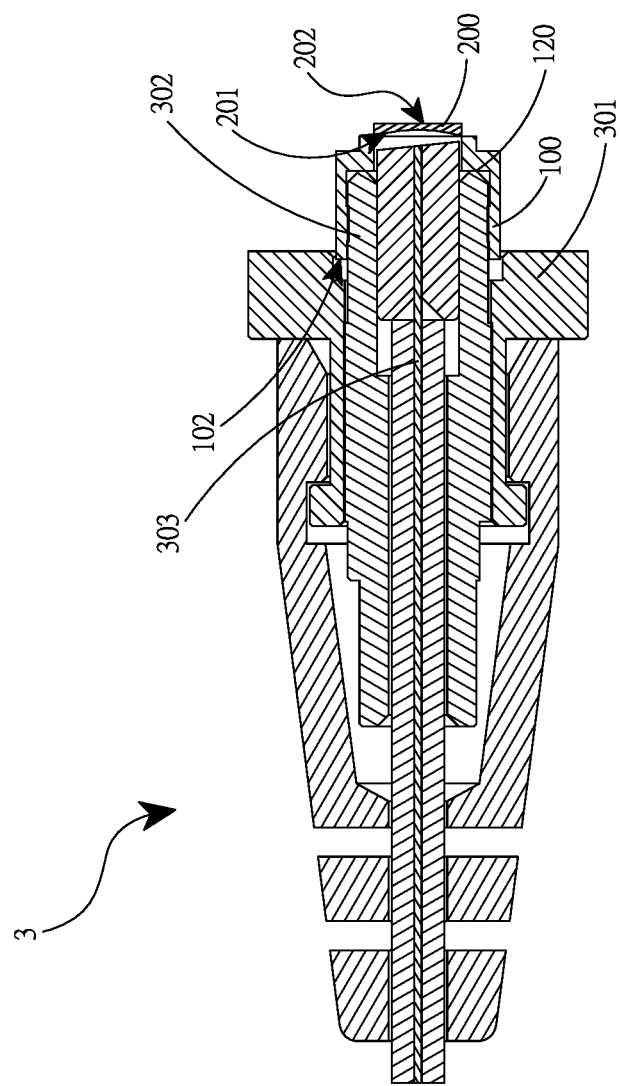
FIG. 3 illustrate a structure of an example embodiment which the optical time domain reflector and the light guiding module are included.
Figure 4:
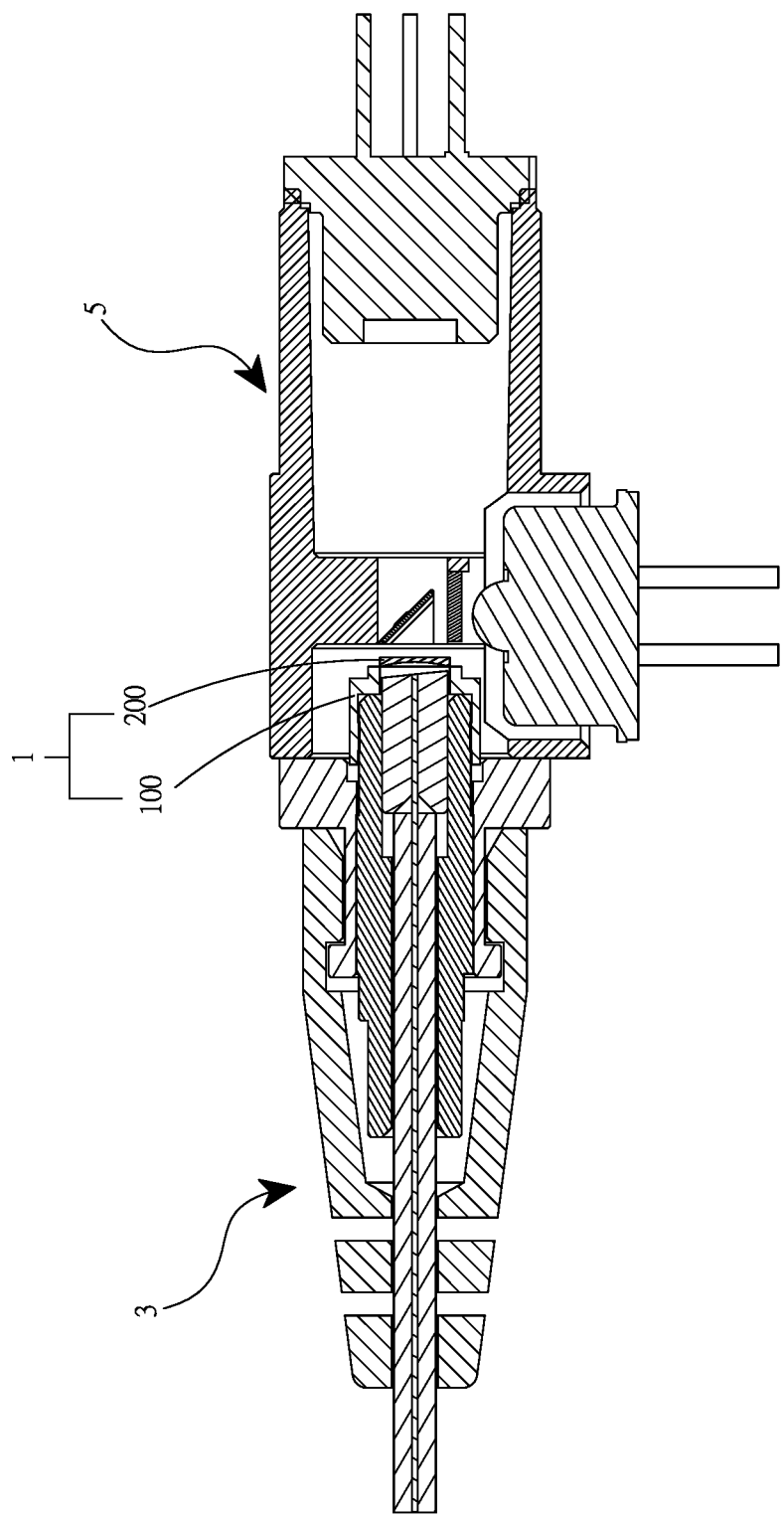
FIG. 4 illustrate a structure of an example embodiment of the optical time domain reflector.
Figure 5:
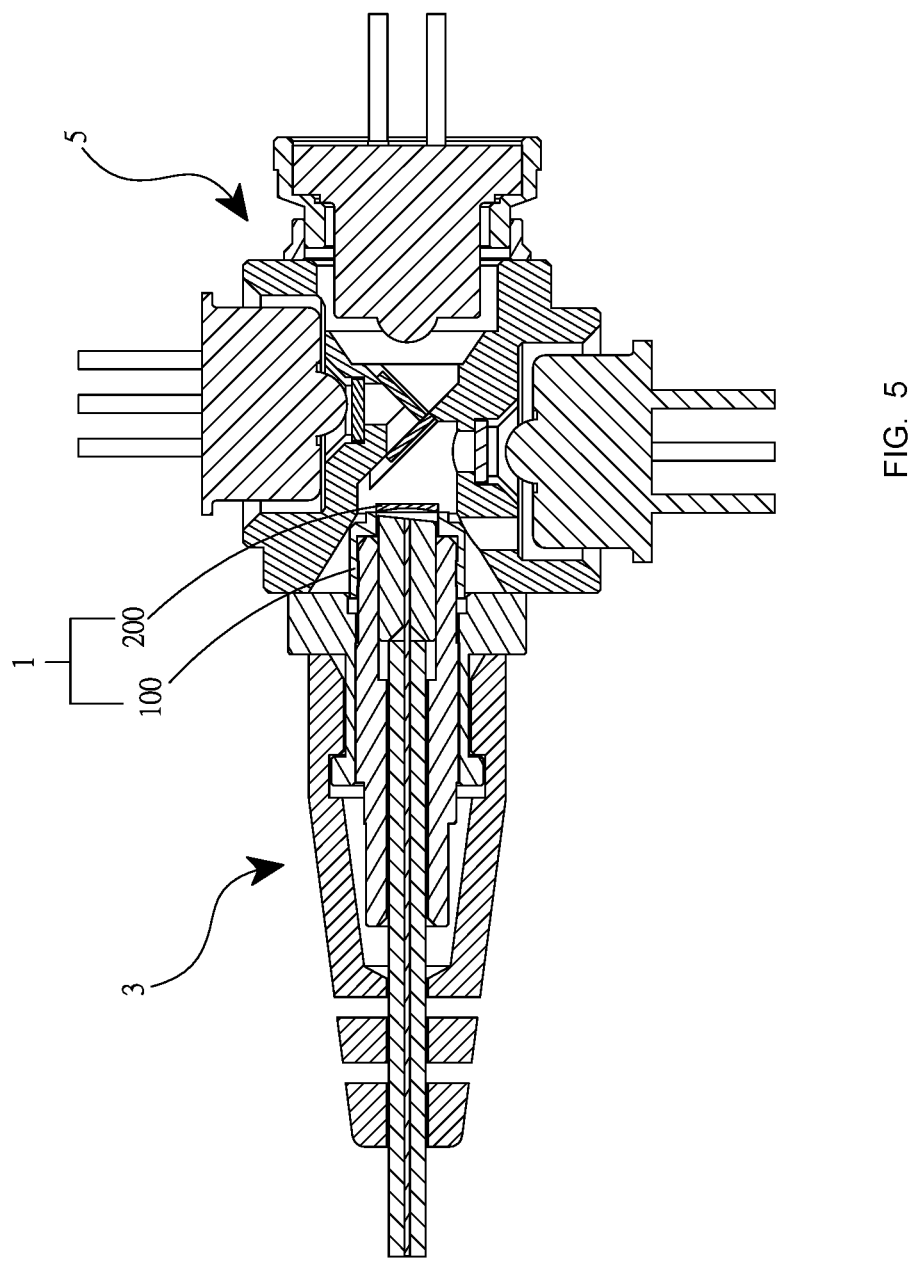
FIG. 5 illustrate a structure of an example embodiment of the optical time domain reflector.

Next, the structure of the optical assembly of the present invention is described herein. Please refer to FIG. 3, FIG. 4 and FIG. 5, and also refer to FIG. 2A and FIG. 2B again. FIG. 3 illustrate a structure of an example embodiment which the optical time domain reflector and the light guiding module are included. FIG. 4 illustrate a structure of an example embodiment of the optical time domain reflector. FIG. 5 illustrate a structure of an example embodiment of the optical time domain reflector. The optical assembly comprise an optical time domain reflector structure 1, a light guiding module 3 and an optical transceiver sub-module 5. The light guiding module 3 is connected to the optical time domain reflector structure 1, and disposed in the carrier 100 through the second end 102. The optical transceiver sub-module 5 is connected to the light guiding module 3, and the optical time domain reflector structure 1 is disposed in the optical transceiver sub-module 5. Wherein, optical signals are emitted from the light guide module 3, parts of the optical signals enter the optical time domain reflector structure 1 and reflected back to the light guiding module 3 by the reflection filter 200.

Wherein, the light guiding module 3 comprises a ferrule fixing tube 301, a ferrule 302 and an optical fiber 303, the ferrule 302 is disposed inside the ferrule fixing tube 301, and the optical fiber 303 is disposed inside the ferrule 302. The ferrule fixing tube 301 is disposed against the second end 102 of the optical time domain reflector structure 1. The ferrule 302 is disposed against the restricting part 120 of the optical time domain reflector structure 1.

In the present invention, the position between the reflection filter 200 and the optical fiber 303 is one of the key factors affecting the return intensity of the optical signals. When the distance between the reflection filter 200 and the optical fiber 303 is smaller, the returned optical signals reflected by the reflection filter 200 will increase. Accordingly, the straight distance between the fiber 303 and the reflection filter 200 is set between 0 mm to 3 mm. That is, the straight distance between the fiber 303 and the reflection filter 200 is not more than 3 mm. The straight distance between the fiber 303 and the reflection filter 200 is defined by the straight distance between the plane where the fiber 303 is located to the center of the first reflection surface 201 of the reflection filter 200. However, the distance between the reflection filter 200 and the restricting part 120 of the carrier 100 is one of the factors that affect the distance between the first reflection surface 201 and the optical fiber 303. So that the distance between the reflection filter 200 and the optical fiber 303 is set in a control range, the straight distance between the reflection filter 200 and the restricting part 120 of the carrier 100 is not less than 3 mm.

In addition, the radius of curvature of the reflection filter 200 is another key that affects the intensity of the returned optical signals. The reflection filter 200 has the characteristics of making the optical signals pass and reflect. In order to increase the intensity of optical signals reflected back to the optical fiber 303, adjusting the first radius of curvature of the first reflection surface 201 is imperative. Since the first reflection surface 201 is disposed to face the optical fiber 303, once the first reflection surface 201 become a concave surface, the optical signals can be more easily refocused to reflect back to the optical fiber 303. Therefore, in the present invention, the first radius of curvature of the first reflection surface 201 is not less than 1 mm. Besides, coating on the first reflection surface 201 also helps the reflection of the optical signals. So the first radius of curvature of the first reflection surface 201 can be unlimited if there is coating on the first reflection surface 201. And of course, the second radius of curvature of the second reflection surface 202 can also be unlimited. Wherein, the reflection filter 200 has a thickness D, the thickness D is the straight distance between the first reflection surface 201 and the second reflection surface 202, and the thickness is not more than 0.7 mm. However, the abovementioned thickness is only a preferred example, the present invention is not limiting the actual thickness of the reflection filter. The thickness of the reflection filter can be adjusted accordingly as required.

Due to the design of the coating on the reflection surface and the concave structure, when the optical fiber 303 emits the optical signals, the first reflection surface 201 reflects the optical signals in a first wavelength range, and allows the optical signals in a second wavelength range. Wherein the first wavelength range is between 1640 nm to 1660 nm, and the second wavelength range is between 1260 nm and 1590 nm.

Through the design of completely dispose the optical time domain reflector structure 1 into the optical transceiver sub-module 5 can reduce the overall occupied space. The optical time domain reflector structure 1 can be disposed in the Bi-direction Optical Sub-Assembly (BOSA) as shown in FIG. 4, or can be disposed in the Tri-Directional Optical Sub-Assembly (TRI-DI OSA) as shown in FIG. 5. However, the embodiment is only an example, the present invention is not limiting the types of optical transceiver sub-modules, as long as the optical time domain reflection device can be installed inside it to achieve the effect of reducing the overall occupied space.

Next, a brief example is given to illustrate the process of assembling the optical assembly of the present invention. First, the reflection filter is placed on the first end of the carrier and is restricted to the position of the fixing part, and at the same time, using glue for coating and baking and curing. Then, the object combined with the reflection filter and the carrier is inserted into the ferrule fixing tube of the optical fiber, and during the insertion process, the distance between the reflection filter and the optical fiber is set in advance, and the restricting part is used to control the distance between the ferrule and the carrier. All the components can be fixed until the reflection filter and the optical fiber are on the right position. The fixing method can be, for example, the method of dispensing, baking and curing, or using the ferrule to fix The tight fit between the tube and the inner hole of the bearing seat slowly presses the bearing seat into the ferrule fixing tube until the reflected light intensity reaches the specification value, and then stop riveting. Finally, the above-mentioned matching parts of the optical time domain reflector and the light guide module can be combined with the optical transceiver sub-module to complete the assembly operation. However, the above assembly process is only an example, and the present invention is not limiting the assembly process of the optical components, as long as the optical time domain reflector structure, the light guiding module and optical transceiver sub-module can be combined.

Accordingly, the present invention provides an optical time domain reflector structure and the optical assembly thereof. The optical time domain reflector structure is applying on the optical assembly. The optical assembly comprises the optical time domain reflector structure, the light guiding module and the optical transceiver sub-module. The optical time domain reflector structure comprises reflection filter, and the reflection filter is disposed on the optical path. When the optical signals emitted from the light guiding module, the optical signals will follow the optical path to the optical time domain reflector structure. Via the disposing of the first reflection surface, parts of the optical signals will be reflected back to the light guiding module, and the rest of the optical signals will pass through the first reflection surface and the second reflection surface into the optical transceiver sub-module. In this way, the optical signals can be further send back to the optical time domain reflectometer, so as to further check the feedback signals to ensure that the optical fiber lines are working normally.

The optical time domain reflector structure and the optical assembly thereof of the present invention have advantages as follow.

1. By adjusting the radius of curvature of the first reflection surface, the first reflection surface becomes a concave surface facing the optical fiber, so that the optical signal of a specific wavelength can be focused back to the optical fiber to enhance the intensity of the returned optical signal.

2. Since the optical time domain reflector structure of the present invention is directly arranged inside the optical transceiver sub-module, it does not occupy the external space outside the optical transmission sub-module, which greatly reduces the overall occupied space.

3. The present invention does not require additional installation of passive components containing fiber gratings, not only reduces the problem of tolerances that may occur during installation, also saves the time required to install the optical time domain reflector structure.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An optical time domain reflector structure, configuring to reflect at least a part of a plurality of optical signal on an optical path, comprising
   a carrier, having a first end and a second end, the carrier comprises a restricting part and a fixing part, the restricting part is disposed between the first end and the second end, and the fixing part is disposed on the first end and spaced apart from the restricting part; and
   a reflection filter, disposed on the fixing part in spaced apart relation from the restricting part, and connected to the first end, the reflection filter comprises a first reflection surface and a second reflection surface, the first reflection surface and the second reflection surface are respectively located on opposite sides of the reflection filter, the first and the second reflection surface have a first radius of curvature and a second radius of curvature respectively, and the first radius of curvature is not bigger than the second radius of curvature;

wherein parts of the optical signals are reflected by the reflection filter and back along to the optical path.

2. The optical time domain reflector structure of claim 1, wherein the reflection filter is disposed on the way of the optical path.

3. The optical time domain reflector structure of claim 1, wherein the straight distance between the reflection filter and the restricting part is not less than 3 mm.

4. The optical time domain reflector structure of claim 1, wherein the first reflection surface is disposed toward the first end.

5. The optical time domain reflector structure of claim 1, wherein the first radius of curvature of the first reflection surface is not less than 1 mm.

6. The optical time domain reflector structure of claim 1, wherein the first radius of curvature of the first reflection surface is unlimited.

7. The optical time domain reflector structure of claim 1, wherein the second radius of curvature of the second reflection surface is unlimited.

8. The optical time domain reflector structure of claim 1, wherein the reflection filter has a thickness, the thickness is the straight distance between the first reflection surface and the second reflection surface, and the thickness is not more than 0.7 mm.

9. The optical time domain reflector structure of claim 1, wherein the first reflection surface reflects the optical signals in a first wavelength range, and allows the optical signals in a second wavelength range.

10. The optical time domain reflector structure of claim 9, wherein the first wavelength range is between 1640 nm to 1660 nm, and the second wavelength range is between 1260 nm and 1590 nm.

11. The optical time domain reflector structure of claim 1, wherein the restricting part is located on an inner surface of the carrier.

12. An optical assembly, comprising:
an optical time domain reflector structure, comprising:
a carrier, having a first end and a second end, the carrier comprises a restricting part and a fixing part, the restricting part is disposed between the first end and the second end, and the fixing part is disposed on the first end; and
a reflection filter, disposed on the fixing part, and connected to the first end, the reflection filter comprises a first reflection surface and a second reflection surface, the first reflection surface and the second reflection surface are respectively located on opposite sides of the reflection filter, the first and the second reflection surface have a first radius of curvature and a second radius of curvature respectively, and the first radius of curvature is not bigger than the second radius of curvature, the reflection filter axially spaced apart from the restricting part;
a light guiding module, connected to the optical time domain reflector structure, and disposed in the carrier through the second end; and
an optical transceiver sub-module, connected to the light guiding module, and the optical time domain reflector structure is disposed in the optical transceiver sub-module;
wherein, when a plurality of optical signals is emitted from the light guide module, parts of the optical signals enter the optical time domain reflector structure and reflected back to the light guiding module by the reflection filter.

13. The optical assembly of claim 12, wherein the light guiding module comprises a ferrule fixing tube, a ferrule and an optical fiber, the ferrule is disposed inside the ferrule fixing tube, and the optical fiber is disposed inside the ferrule.

14. The optical assembly of claim 13, wherein the ferrule fixing tube is disposed against the second end of the optical time domain reflector structure.

15. The optical assembly of claim 13, wherein the restricting part presents a radial flange surface and the ferrule is disposed against the radial flange surface of the restricting part of the optical time domain reflector structure.

16. The optical assembly of claim 13, wherein the straight distance between the fiber and the reflection filter is not more than 3 mm.

17. The optical assembly of claim 12, wherein the optical transceiver sub-module is selected from Bi-direction Optical Sub-Assembly (BOSA), Tri-Directional Optical Sub-Assembly (TRI-DI OSA), and the combination thereof.

18. The optical assembly of claim 12, wherein the reflection filter is disposed on the way of an optical path, the optical signals follow the optical path when emitted from the light guiding module.

19. The optical assembly of claim 18, wherein the first reflection surface reflects the optical signals in a first wavelength range, and allows the optical signals in a second wavelength range.

20. The optical assembly of claim 19, wherein the first wavelength range is between 1640 nm to 1660 nm, and the second wavelength range is between 1260 nm and 1590 nm.

21. The optical time domain reflector structure of claim 1, wherein the fixing part is a filter restriction section in which the reflection filter is accommodated.

22. The optical time domain reflector structure of claim 1, wherein the restricting part defines a radial surface against which an associated ferrule having an optical fiber disposed therein abuts.

* * * * *